United States Patent [19]

Schmolka

[11] Patent Number: 4,735,015

[45] Date of Patent: Apr. 5, 1988

[54] SEED PROTECTIVE COATING

[75] Inventor: Irving R. Schmolka, Grosse Ile, Mich.

[73] Assignee: BASF Corporation, Parsippany, N.J.

[21] Appl. No.: 555,141

[22] Filed: Nov. 25, 1983

[51] Int. Cl.$^4$ ................................................ A01C 1/06
[52] U.S. Cl. ............................................ 47/57.6; 41/32
[58] Field of Search ............................... 427/4; 47/57.6

[56] References Cited

U.S. PATENT DOCUMENTS

| | | | |
|---|---|---|---|
| 2,648,609 | 8/1953 | Wurster | 427/213 |
| 2,828,345 | 3/1958 | Spriggs | 568/624 |
| 2,999,336 | 9/1961 | Cescas | 47/58 |
| 3,022,335 | 2/1962 | Lundsted | 536/120 |
| 3,113,399 | 12/1963 | Eversole | 47/57.6 |
| 3,803,761 | 4/1974 | Watts et al. | 427/4 |
| 3,991,517 | 11/1976 | Lewis | 47/57.6 |
| 4,272,417 | 6/1981 | Barke et al. | 47/57.6 |

OTHER PUBLICATIONS

*Encyclopedia of Polymer Science and Technology,* vol. 6, pp. 156, 160, 168 and 172, John Wiley & Sons, Inc., 1967.

*Primary Examiner*—Glennon H. Hollrah
*Assistant Examiner*—Amelia A. Owens
*Attorney, Agent, or Firm*—Joseph D. Michaels; Bernhard R. Swick

[57] ABSTRACT

A plant seed is prepared by enveloping the seed in a coating of a film-forming composition comprising certain polyoxyethylene-polyoxybutylene block copolymers.

3 Claims, No Drawings

SEED PROTECTIVE COATING

BACKGROUND OF THE INVENTION

This invention relates to coated seeds and to a method for coating seeds.

In the Technology Newsletter appearing on page 33 of *Chemical Week*, dated Aug. 12, 1981, it is pointed out that researchers from the Department of Agriculture have found that a coating of polyethylene glycol on soybean, pea and other legume seeds improves germination and early growth. This is supported by the statement that Lowell W. Woodstock and Kar-Ling J. Tao, reporting in *Physiologia Plantarum*, say that seed growth depends in part on the seed's ability to withstand the rapid uptake of water immediately after p)anting. According to this item, because polyethylene glycol molecules are larger than water molecules, the chemical slows this water uptake by blocking the passage of water through the membrane to the critical growth axis of the seed, giving the seed membrane time to repair damage and reduce the leakage of enzymes, nucleotides, amino acids and other cell constituents that regulate the seed's life processes. The *Chemical Week* item goes on to report that two researchers from Boyce Thompson Institute (Ithaca, N.Y.) have also shown that soybean seeds coated with polyethylene glycol and gum arabic exhibit substantial protection against injury from chilling.

Because of the vagaries of weather, it is not possible to control the amount of rainfall upon the open fields. As a result, when a heavy rain follows the planting of soybean and other legume seeds which have been coated with a polyoxyethylene glycol polymer, the coating disappears rapidly due to its high rate of solubility in water. This leaves the seeds without the protective coating and thus susceptible to the many dangers due to chilling and/or high moisture content of the ground surrounding the seed. Accordingly, it is a purpose of this invention to provide coated seeds which may be planted early either before or during the spring rainy season which are not as susceptible to the problems presented by said spring rains.

| U.S. Patents of Interest | | | |
|---|---|---|---|
| U.S. Pat. No. | Issued | Inventor(s) | Assignee |
| 3,803,761 | 4/16/74 | Watts et al | Dow |
| 3,947,996 | 4/6/76 | Watts | Dow |
| 3,698,133 | 10/17/72 | Schreiber | Canadian Patents & Development Ltd. |
| 2,999,336 | 9/12/61 | Cescas | Compagnie Nord-Africaine de L'Hyperphosphate |
| 4,377,054 | 3/22/83 | Howe et al | Monsanto |

SUMMARY OF THE INVENTION

A plant seed is prepared by enveloping the seed in a coating of a film-forming composition comprising certain polyoxyethylene-polyoxybutylene block copolymers. This is accomplished by depositing on the seeds a thin film of the copolymer. The copolymer may be melted and applied to the seeds in molten form or may be dissolved in a solvent or dispersed in other liquid for application to the seed. As employed throughout the instant specification and claims, the term "solvent" means a solvent for the block copolymer coating material of this invention. Other materials such as inert fillers may be included for any particular function that might be desired.

The polyoxyethylene-polyoxybutylene block copolymer has a polyoxybutylene hydrophobe molecular weight of about 1500 to 5000 and the oxyethylene groups constitute about 60 to 90 percent of the total weight of the copolymer.

DESCRIPTION OF THE PREFERRED EMBODIMENTS

The preferred polyoxybutylene-polyoxyethylene block copolymer of use in the invention is a cogeneric mixture of conjugated polyoxybutylene-polyoxyethylene compounds having as a hydrophobe a polyoxybutylene polymer having a molecular weight of about 1500 to 5000. The polyoxybutylene compounds are prepared by first condensing butylene oxide with an organic compound containing a plurality of reactive hydrogen atoms to prepare a polyoxybutylene polymer having a molecular weight of about 1500 to 5000 and subsequently condensing ethylene oxide therewith. The compounds used in this invention conform to the following general formula:

$$Y[(C_4H_8O)_n\text{—}E\text{—}H]_x \qquad (A)$$

wherein Y is the residue of a water soluble organic compound containing therein x active hydrogen atoms; n is an integer; x is an integer greater than 1; the values of n and x are such that the molecular weight of the compound, exclusive of E, is about 1500 to 5000 as determined by hydroxyl number; E is a polyoxyalkylene chain wherein the oxygen/carbon atom ratio is at least 0.5, and E constitutes about 60 to 90 percent of the total weight of the compound.

The polyoxybutylene polymer, which is an intermediate in the preparation of the compounds of use in this invention, bas the following structure:

$$Y[(C_4H_8O)_nH]_x \qquad (B)$$

wherein Y, n and x are defined as in Formula A above.

The preferred compounds of use in this invention are prepared by condensing ethylene oxide in an amount between 60 and 90 percent of the total weight of the resultant compound, with the polyoxybutylene polymer. These compounds have the following formula:

$$Y[(C_4H_8O)_n(C_2H_4O)_mH]_x \qquad (C)$$

wherein Y, n and x are defined as in Formula A and m has a value such that the oxyethylene groups constitute about 60 to 90 percent of the total weight of the compound.

When ethylene oxide is condensed with a polyoxybutylene glycol of about 1500 to 5000 and preferably 2000 to 4000 molecular weight and derived from a butanediol initiator, the resulting compounds have the following structure:

$$HO(C_2H_4O)_m(C_4H_8O)_n(C_2H_4O)_mH \qquad (D)$$

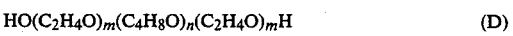

where n is defined as set forth with respect to Formula A and m has a value such that the oxyethylene groups constitute 60 to 90 percent of the total weight of the compound.

The hydrophilic portion of the polyoxyalkylene compounds may be supplied in whole or in part by other polyoxyalkylene chains in lieu of the polyoxyethylene chain set forth in Formula C. Any polyoxyalkylene chain may be used provided that the oxygen/carbon atom ratio is at least 0.5.

Examples of a water-soluble organic compound containing therein x active hydrogen atoms, the residue of which is Y, are the initiators which may include water, diols such as propanediol, butanediol, triols such as glycerol and trimethylol propane, tetrols such as pentaerythritol as well as initiators containing more than four hydroxyl groups such as hexitol or sucrose. Also, amines and other low molecular weight water-soluble compounds having two or more active hydrogen atoms, such as ethylene diamine or diethylene triamine, may be used as the initiator. Preferably used is butanediol. More preferably used is 1,4-butanediol.

The butylene oxide used in making the hydrophobic polyoxybutylene polymer, which is an intermediate in the preparation of the compounds used in this invention, may be replaced with up to 30 percent by weight of propylene oxide or ethylene oxide when added as a mixture with the butylene oxide. Also, up to 30 percent by weight of propylene oxide or butylene oxide may be used to replace ethylene oxide, when added as a mixture with ethylene oxide, in preparing the surfactants used in this invention. In lieu of butylene oxide, other 4-carbon cyclic ethers such as methyloxetane, tetrahydrofuran and isobutylene oxide may be used.

Surfactants of the invention, conforming to structures C and D above, are those surfactants which have a hydrophobe molecular weight of between about 1500 and 5000 and ethylene oxide groups in amount of from about 60 to 90 percent of the total weight of the surfactant. Preferably used is a surfactant having a hydrophobe molecular weight of about 2000 to 4000.

Copolymers of the above type are disclosed in U.S. Pat. No. 2,828,345.

Generally the thickness of the coating will be from about 0.5 to 3.0 mm. The seeds may be coated by applying molten copolymer. For example, the molten copolymer or solution may be sprayed on a revolving bed of seed or a copolymer solution. Where a solvent is employed, generally the coating mixture or solution comprises about 20 to 40 percent by weight of the polyoxyethylene polyoxybutylene copolymer and 80 to 60 percent by weight solvent. Examples of such solvents include water, ethyl alcohol, isopropyl alcohol and the well known chlorinated solvents such as carbon tetrachloride and perchlorethylene. Other solvents include benzene, toluene, acetone, ethylmethyl ketone, tetrahydrofuran and cyclohexanone. Mixtures of solvents may also be employed.

Other materials such as inert fillers, moldicides, fungicides and various nutrients such as nitrogen, potassium, and phosphorus and salts thereof may also be coated onto the seeds. In addition, coloring agents may be incorporated with the copolymer or the copolymer solution in order to identify the type of seed or possibly the consumer or distributor.

These other materials, singly or mixtures of one or more, may be incorporated with the copolymer or solution thereof or may be added as a separate coating either directly on the seed prior to the coating with the copolymer or the copolymer may be coated onto the seed first followed by coating with the other materials. The solution may contain from 0 to about 10 percent, preferably about 0.1 to 10 percent by weight of the additional components. Where the other materials are applied as a separate coating rather than incorporated in the copolymer coating, they may be applied molten where appropriate or dissolved or suspended in water or solvent. Such solutions or suspensions may comprise about 20 to 40 percent other material and about 80 to 60 percent water or solvent. Where the additional components form a separate coating from that of the copolymer, they generally have a thickness of from about 0.1 to 1.00 mm. Both water and a solvent may be employed in a single coating liquid where the other materials are water soluble but not solvent soluble. Thus, the copolymer would be dissolved in the solvent and the other materials dissolved in the water and the two mixed together.

Any of the other materials should be able to perform its intended function without detracting unduly from the coating properties or affecting the seed.

Although the invention is useful with all seeds, it is principally adapted to be employed with seeds of plants that reach maturity in one growing season. Typical of such plants are the grasses and grains such as barley, oats, triticale, corn, sunflower, sugar beets, rape, safflower, flax, canary grass, tomatoes, cotton seed and peanuts.

One seed coating procedure which may be employed is an adaption of that claimed in U.S. Pat. No. 2,648,609 wherein an air stream is moved in a confined space upwardly past the seeds with a force sufficient to suspend them continuously therein, and introducing the coating fluid in the form of an atomized mist into the air stream prior to its contact with the seeds. It is also to be observed that in this modification, the air stream is heated to dry quickly the coating applied to the seeds.

The procedure using the apparatus heretofore described may be briefly summarized in the following terms. Heated air is forced through the apparatus by means of a blower to maintain a bed temperature of from about 80° to 120° F. The coating is atomized through a spraying nozzle and is deposited on the seed to be coated in thin layers which are quickly dried under the influence of the heated drying air. The rapid drying provides a cooling effect which prevents overheating of the seed. Application of a plurality of thin, consecutive layers of coating materials soon add up to the total coating required. The degree of dryness of the finished coat can be controlled within the apparatus during the coating operation.

The temperature of the seed during the coating operation should be in the range of about 80° to 120° F. Thus the inlet temperature of the drying medium, which will usually be air, may be somewhat higher. If the seed temperature rises significantly above 120° F. there is a risk that the seed will be killed. Also such temperature may be above the softening temperature of the coating material so that the coated seeds will stick together. If the temperature is significantly below about 80° F. the coating may not be drying fast enough and the coated seeds will stick together. The optimum temperature to be employed may be determined by a simple preliminary experiment taking into account the particular seed to be coated and the coating material used.

The general technique for the production of the coated seed with the above type of apparatus may be described as follows:

Approximately 500 grams of seed which may, for example, be spring wheat, is used in one run. The coating process is commenced with a slow pumping rate, which is therafter controlled to prevent agglomeration of the seed. The time involved for the whole procedure is approximately one hour.

Another coating procedure uses a rotary drum wherein the seed is tumbled while the coating composition is sprayed thereon and a stream of hot air is directed at the coated seeds. The inlet air temperature and coating composition feed rate are controlled so that the temperature of the bed of seeds is maintained between about 80° and 120° F. as determined by a thermocouple probe in the bed. The optimum temperature will depend on the seed being coated and the particular coating composition being applied.

Another seed coating procedure is that described in U.S. Pat. No. 2,999,336 employing a tilted pan. Various other tilted pan-type arrangements, may also be employed, all as well known to those skilled in the art.

For a more complete understanding of the invention, reference is made to the following illustrative examples thereof. As used throughout the instant specification and claims, all parts and percentages are by weight and all temperatures are in degrees centigrade.

EXAMPLE 1

Rape seed is coated by the air suspension method described above using 650 grams of seed and 125 cubic centimeters of a polyoxyethylene polyoxybutylene block copolymer of the type shown in formula D above dissolved in ethyl alcohol. The solution comprises 40 percent of the copolymer and 60 percent of the ethyl alcohol. The copolymer designated herein as copolymer #1 has a polyoxybutylene hydrophobe molecular weight of 1800 and contains oxyethylene groups in the amount of 80 percent of the total copolymer weight. The polyoxybutylene hydrophobic base is prepared by reacting 1,2-butylene oxide with a 1,4-butanediol initiator. The seed when soaked in water for 24 hours loses only a small percentage of the coating. The seeds when planted have a high percentage that germinate.

EXAMPLE 2

Example 1 is repeated with the exception that copolymer #1 is replaced with a copolymer designated herein as copolymer #2 which is a polyoxyethylene adduct of a polyoxybutylene hydrophobic base having a molecular weight of said base of 2400 and wherein the oxyethylene content is about 80 percent of the total weight of the molecule. The seed when soaked in water for 24 hours loses only a small percentage of the coating. The seeds when planted have a high percentage that germinate.

EXAMPLE 3

Example 1 is repeated with the exception that copoymer #1 is replaced with a copolymer designated herein as copolymer #3 which is a polyoxyethylene adduct of a polyoxybutylene hydrophobic base having a molecular weight of said base of about 3000 and wherein the oxyethylene content is about 70 percent of the total weight of the molecule. The seed when soaked in water for 24 hours loses only a small percentage of the coating. The seeds when planted have a high percentage that germinate.

EXAMPLE 4

Example 1 is repeated with the exception that copolymer #1 is replaced with a copolymer indicated herein as copolymer #4 which is a polyoxyethylene adduct of a polyoxybutylene hydrophobic base having a molecular weight of said base of about 3000 and wherein the oxyethylene content is about 80 percent of the total weight of the molecule. The seed when soaked in water for 24 hours loses only a small percentage of the coating. The seeds when planted have a high percentage that germinate.

EXAMPLE 5

Example 1 is repeated with the exception that copolymer #1 is replaced with a copolymer designated herein as copolymer #5 which is a polyoxyethylene adduct of a polyoxybutylene hydrophobic base having a molecular weight of said base of about 3000 and wherein the oxyethylene content is about 60 percent of the total weight of the molecule. The seed when soaked in water for 24 hours loses only a small percentage of the coating. The seeds when planted have a high percentage that germinate.

EXAMPLE 6

Example 1 is repeated with the exception that the rotary drum coating procedure is employed as described above in lieu of the upwardly moving air stream type apparatus. The seed when soaked in water for 24 hours loses only a small percentage of the coating. The seeds when planted have a high percentage that germinate.

EXAMPLE 7

Example 1 is repeated with the exception that a tilted pan type apparatus, as described in U.S. Pat. No. 2,999,336, is employed in lieu of the apparatus employed in Example 1. The molten copolymer is added from a hopper from which it flows onto a perforated plate from which the molten copolymer drips down onto the seed in the tilted pan. The seed when soaked in water for 24 hours loses only a small percentage of the coating. The seeds when planted have a high percentage that germinate.

EXAMPLE 8

Example 1 is repeated with the exception that the seed is safflower seed. The seed when soaked in water for 24 hours loses only a small percentage of the coating. The seeds when planted have a high percentage that germinate.

EXAMPLE 9

Example 1 is repeated with the exception that the copolymer is added as an aqueous alcoholic solution containing 25 percent by weight of the polymer and 75 percent by weight of a 30:70 mixture of ethyl methyl ketone and water. The seed when soaked in water for 24 hours loses only a small percentage of the coating. The seeds when planted have a high percentage that germinate.

EXAMPLE 10

Example 9 is repeated with the exception that the solution is a mixture of 30 percent copolymer #1, 60 percent water, and 10 percent of a 5,10,5-potassium, nitrogen and phosphorus-containing fertilizer. The seed when soaked in water for 24 hours loses only a small percentage of the coating. The seeds when planted have a high percentage that germinate.

EXAMPLE 11

Example 1 is repeated with the exception that the seed is cotton seed. The seed when soaked in water for 24 hours loses only a small percentage of the coating. The seeds when planted have a high percentage that germinate.

EXAMPLE 12

Example 9 is repeated after which the copolymer coated seed is coated with a second coating of a 20 percent aqueous suspension of 5-10-5 potassium, nitrogen and phosphorous-containing fertilizer. The seed when soaked in water for 24 hours loses only a small percentage of the coating. The seeds when planted have a high percentage that germinate.

The embodiments in which an exclusive privilege or property is claimed are defined as follows:

1. A seed having an adherent coating thereon of a polyoxyethylene-polyoxybutylene copolymer of the formula:

$$Y[(C_4H_8O)_n(C_2H_4O)_mH]_2$$

wherein Y is butylene glycol; n is an integer; the value of n is such that the molecular weight of the oxybutylene groups is from about 1500 to 5000 and the value of m is such that the oxyethylene groups constitute about 60 to 90 percent of the total weight of the compound.

2. The coated seed of claim 1 wherein Y is a butylene glycol whereby the resulting compounds have the structure $HO(C_2H_4O)_m(C_4H_8O)_n(C_2H_4O)_mH$ wherein n has a value such that the oxybutylene groups have a molecular weight of about 1500 to 5000 and m has a value such that the oxyethylene groups constitute about 60 to 90 percent of the total weight of the compound.

3. The coated seed of claim 2 wherein said coating has a thickness of about 0.5 to 3.0 mm.

* * * * *